(12) United States Patent
Roy et al.

(10) Patent No.: US 10,801,169 B2
(45) Date of Patent: Oct. 13, 2020

(54) TRUCK SAFETY MODULES FOR ASSISTING WORKPERSONS TO PLACE AND RETRIEVE TRAFFIC DELINEATORS

(71) Applicant: ROYAL TRUCK & EQUIPMENT, INC., Coopersburg, PA (US)

(72) Inventors: Robert H Roy, Emmaus, PA (US); Andrew C Washburn, Coopersburg, PA (US); Joseph T Piggott, Easton, PA (US); Siddharth Balasubramanian, Allentown, PA (US)

(73) Assignee: Royal Truck & Equipment, Inc, Coopersburg, PA (US)

( * ) Notice: Subject to any disclaimer, the term of this patent is extended or adjusted under 35 U.S.C. 154(b) by 0 days.

(21) Appl. No.: 16/159,813

(22) Filed: Oct. 15, 2018

(65) Prior Publication Data

US 2019/0048543 A1 Feb. 14, 2019

Related U.S. Application Data

(63) Continuation-in-part of application No. 16/132,376, filed on Sep. 15, 2018, now Pat. No. 10,556,545, which is a continuation-in-part of application No. 15/913,562, filed on Mar. 6, 2018, now Pat. No. 10,319,227, which is a continuation-in-part of
(Continued)

(51) Int. Cl.
*B60R 11/06* (2006.01)
*B60R 21/02* (2006.01)
*B60P 3/14* (2006.01)
*B60R 21/00* (2006.01)
*E01F 9/70* (2016.01)

(52) U.S. Cl.
CPC ............... *E01F 9/70* (2016.02); *B60P 3/14* (2013.01); *B60R 11/06* (2013.01); *B60R 21/00* (2013.01); *B60R 21/02* (2013.01)

(58) Field of Classification Search
CPC . E01F 9/70; B60R 11/06; B60R 1/002; B60R 9/048; G09F 27/005; B60P 3/14
See application file for complete search history.

(56) References Cited

U.S. PATENT DOCUMENTS 3,157,267 A 11/1964 Asbury ..................... E01H 1/14
                                                        198/310
3,232,408 A  2/1966 Asbury ..................... E01F 9/70
                                                        198/617
(Continued)

*Primary Examiner* — Hoi C Lau
(74) *Attorney, Agent, or Firm* — David A. Burge; Benjamin D. Burge

(57) ABSTRACT

Right and left safety module embodiments are designed to be installed in insets located midway along right and left sides of flatbed trucks. The modules provide "man baskets" that have lower and upper platforms. While the truck is being driven alongside a roadway work zone, a workperson standing on the module's lower platform either 1) moves traffic delineators one at a time from the upper platform, and then places the delineators at spaced locations alongside the roadway work zone, or 2) removes traffic delineators one at a time from spaced locations alongside the roadway work zone, and then places the delineators onto the upper platform. Vertically movable safety rails and pivotal safety gates of the modules prevent falls from the modules of workpersons standing on the lower platform.

30 Claims, 11 Drawing Sheets

Related U.S. Application Data application No. 15/197,685, filed on Jun. 29, 2016, now abandoned.

(60) Provisional application No. 62/638,818, filed on Mar. 5, 2018, provisional application No. 62/631,840, filed on Feb. 18, 2018, provisional application No. 62/186,036, filed on Jun. 29, 2015.

(56) References Cited

U.S. PATENT DOCUMENTS

| | | | | |
|---|---|---|---|---|
| 3,709,178 | A | 1/1973 | Piker | B63B 35/732 |
| | | | | 114/61.33 |
| D229,784 | S | 1/1974 | Carter | D29/2 |
| 3,952,690 | A | 4/1976 | Rizzo et al. | E01F 9/01 |
| | | | | 116/63 |
| D243,073 | S | 1/1977 | Kulp et al. | D10/6 |
| D243,075 | S | 1/1977 | Kulp et al. | D10/6 |
| 4,083,033 | A | 4/1978 | Kulp et al. | E01F 9/00 |
| | | | | 340/114 |
| 4,219,141 | A | 8/1980 | Lovy | E01F 9/70 |
| | | | | 116/28 R |
| 4,319,778 | A | 3/1982 | Leonard et al. | B60P 3/34 |
| | | | | 296/166 |
| 4,597,706 | A | 7/1986 | Michit | E01F 9/688 |
| | | | | 414/788.2 |
| 4,642,007 | A * | 2/1987 | Marshall | B60P 3/055 |
| | | | | 296/183.1 |
| 4,674,431 | A | 6/1987 | Cory | G08B 23/00 |
| | | | | 116/63 |
| 4,710,053 | A | 12/1987 | Kulp et al. | E01F 9/00 |
| | | | | 404/9 |
| 4,747,515 | A | 5/1988 | Kasher et al. | B65G 59/06 |
| | | | | 221/116 |
| 4,973,190 | A | 11/1990 | Erwin et al. | E01F 9/00 |
| | | | | 404/10 |
| 5,054,648 | A * | 10/1991 | Luoma | E01F 9/70 |
| | | | | 198/512 |
| 5,080,541 | A | 1/1992 | Andre | B60P 3/08 |
| | | | | 410/24.1 |
| 5,201,599 | A | 4/1993 | Kulp et al. | E01F 13/00 |
| | | | | 404/6 |
| 5,208,585 | A | 5/1993 | Sprague | E01F 15/086 |
| | | | | 116/63 |
| 5,209,540 | A * | 5/1993 | Metler | B60P 3/002 |
| | | | | 105/370 |
| 5,213,464 | A | 5/1993 | Nicholson et al. | B65G 59/06 |
| | | | | 414/440 |
| 5,234,280 | A | 8/1993 | Cowan | E01F 9/00 |
| | | | | 404/6 |
| 5,244,334 | A * | 9/1993 | Akita | E01F 9/70 |
| | | | | 414/502 |
| 5,435,662 | A | 7/1995 | Brown | E01C 23/06 |
| | | | | 116/63 C |
| 5,476,301 | A | 12/1995 | Berkich | B60P 3/00 |
| | | | | 296/3 |
| 5,525,021 | A | 6/1996 | Larguier | E01F 9/70 |
| | | | | 414/551 |
| 5,846,045 | A | 12/1998 | Johnson et al. | B60R 9/00 |
| | | | | 414/462 |
| 5,868,520 | A | 2/1999 | Kulp et al. | E01F 13/00 |
| | | | | 404/6 |
| 5,905,434 | A | 5/1999 | Steffan | B60Q 1/50 |
| | | | | 116/28 |
| 6,019,542 | A | 2/2000 | Bent et al. | E01F 13/02 |
| | | | | 404/6 |
| 6,056,498 | A | 5/2000 | Velinsky | E01F 9/70 |
| | | | | 414/501 |
| 6,158,948 | A | 12/2000 | Calvert | B60P 1/38 |
| | | | | 116/63 C |
| 6,183,042 | B1 * | 2/2001 | Unrath | E01F 9/662 |
| | | | | 293/118 |
| 6,364,400 | B1 * | 4/2002 | Unrath | E01F 9/662 |
| | | | | 296/1.05 |
| 6,413,033 | B1 | 7/2002 | Monroig | B60P 3/122 |
| | | | | 414/462 |
| 6,435,369 | B1 * | 8/2002 | Poursayadi | E01F 9/70 |
| | | | | 221/185 |
| D466,269 | S | 11/2002 | Falland | D34/39 |
| 6,478,505 | B1 | 11/2002 | Kulp et al. | E01F 15/00 |
| | | | | 404/6 |
| D481,965 | S | 11/2003 | Feit et al. | D10/113 |
| D486,089 | S | 2/2004 | Mettler et al. | D10/109 |
| D487,365 | S | 3/2004 | Bourne | D6/462 |
| 6,726,434 | B2 | 4/2004 | Orthaus | E01F 9/70 |
| | | | | 414/435 |
| 6,752,582 | B2 | 6/2004 | Garcia | E01F 9/688 |
| | | | | 116/63 C |
| 6,786,673 | B2 | 9/2004 | Kulp et al. | E01F 15/00 |
| | | | | 404/6 |
| 6,971,329 | B1 | 12/2005 | Stewart | E01F 13/028 |
| | | | | 116/63 C |
| 7,101,143 | B2 | 9/2006 | Orthaus | E01F 9/70 |
| | | | | 414/551 |
| D541,555 | S | 5/2007 | Falland | D6/621 |
| 7,431,532 | B2 | 10/2008 | Lidster | E01F 9/70 |
| | | | | 404/6 |
| 7,581,918 | B2 * | 9/2009 | Jordan | E01F 9/70 |
| | | | | 198/315 |
| D628,353 | S | 11/2010 | Garton et al. | D34/38 |
| D628,354 | S | 11/2010 | Garton et al. | D34/38 |
| D628,355 | S | 11/2010 | Spann et al. | D34/38 |
| D646,044 | S | 9/2011 | Garton et al. | D34/38 |
| 8,500,360 | B1 | 8/2013 | Jones | E01F 9/70 |
| | | | | 256/13.1 |
| 8,740,241 | B2 * | 6/2014 | Groeneweg | F41H 13/00 |
| | | | | 280/423.1 |
| 8,794,172 | B2 | 8/2014 | Bromm et al. | E01F 9/012 |
| | | | | 116/63 |
| 9,056,572 | B2 * | 6/2015 | Hemphill | B60P 1/02 |
| 9,489,841 | B1 | 11/2016 | Huggins | G08G 1/056 |
| 10,112,528 | B1 | 10/2018 | Mazuir | B60Q 1/444 |
| 10,160,373 | B2 * | 12/2018 | Tovornik | B60P 3/14 |
| 10,272,861 | B2 | 4/2019 | Wymore | B60R 19/48 |
| 10,319,227 | B2 * | 6/2019 | Roy | G09F 27/005 |
| 2001/0000120 | A1 * | 4/2001 | Unrath | E01F 9/662 |
| | | | | 296/186.1 |
| 2003/0147733 | A1 | 8/2003 | Shimomato | B60P 1/00 |
| | | | | 414/501 |
| 2004/0057822 | A1 * | 3/2004 | Orthaus | E01F 9/70 |
| | | | | 414/539 |
| 2004/0057824 | A1 * | 3/2004 | Orthaus | E01F 9/70 |
| | | | | 414/789.7 |
| 2005/0074143 | A1 | 4/2005 | Kawai | B60D 1/36 |
| | | | | 382/104 |
| 2005/0095105 | A1 | 5/2005 | Parks | E01F 9/70 |
| | | | | 414/540 |
| 2005/0199640 | A1 | 9/2005 | Clark | E01F 9/688 |
| | | | | 221/1 |
| 2006/0012487 | A1 | 1/2006 | Gibson | G08B 5/006 |
| | | | | 340/815.45 |
| 2006/0291957 | A1 * | 12/2006 | Lidster | E01F 9/70 |
| | | | | 404/73 |
| 2007/0071584 | A1 | 3/2007 | Beckstead et al. | B60P 1/04 |
| | | | | 414/467 |
| 2007/0183874 | A1 | 8/2007 | Garcia | B60P 1/00 |
| | | | | 414/437 |
| 2009/0097914 | A1 | 4/2009 | Flynn | E01F 9/012 |
| | | | | 404/9 |
| 2009/0166998 | A1 | 7/2009 | Groeneweg | E01F 15/148 |
| | | | | 280/408 |
| 2009/0256697 | A1 | 10/2009 | Tallinger | B60Q 1/2611 |
| | | | | 340/472 |
| 2011/0163517 | A1 | 7/2011 | Groeneweg | B60P 3/00 |
| | | | | 280/423.1 |
| 2012/0211302 | A1 * | 8/2012 | Stewart | B66F 11/04 |
| | | | | 182/12 |

(56) References Cited

U.S. PATENT DOCUMENTS

| | | | |
|---|---|---|---|
| 2013/0064632 A1 | 3/2013 | Pawluk | B61D 3/18 |
| | | | 414/482 |
| 2013/0156532 A1* | 6/2013 | Hemphill | B60P 1/02 |
| | | | 414/495 |
| 2014/0111323 A1 | 4/2014 | Strout | B60Q 2/268 |
| | | | 340/425.5 |
| 2014/0200759 A1 | 7/2014 | Lu | B60D 1/245 |
| | | | 701/28 |
| 2015/0225913 A1 | 8/2015 | Groeneweg | E01F 15/148 |
| | | | 212/299 |
| 2016/0333537 A1 | 11/2016 | Julien | E01F 9/70 |
| 2016/0379492 A1 | 12/2016 | Roy | G08G 1/09 |
| | | | 340/907 |
| 2017/0106780 A1* | 4/2017 | Tovornik | B60P 3/14 |
| 2017/0246988 A1 | 8/2017 | Ihedinmah | B60Q 1/503 |
| 2017/0287233 A1 | 10/2017 | Nix | G07C 5/008 |
| 2018/0001817 A1 | 1/2018 | Adams | B60Q 1/2611 |
| 2018/0121742 A1 | 5/2018 | Son | G06T 7/74 |
| 2018/0125030 A1 | 5/2018 | Glover | A01K 5/0225 |
| 2018/0194352 A1 | 7/2018 | Avedisov | B60W 30/16 |
| 2018/0195246 A1 | 7/2018 | Hanssen | E01F 9/70 |
| 2018/0261088 A1* | 9/2018 | Roy | G09F 27/005 |
| 2019/0031111 A1* | 1/2019 | Roy | B60R 9/048 |
| 2019/0048543 A1* | 2/2019 | Roy | E01F 9/70 |
| 2019/0241126 A1 | 8/2019 | Murad | B60R 1/12 |
| 2019/0308547 A1 | 10/2019 | Sousa Vazquez | B61D 3/18 |
| 2019/0330811 A1* | 10/2019 | Roy | B60R 1/002 |

\* cited by examiner

TRUCK SAFETY MODULES FOR ASSISTING WORKPERSONS TO PLACE AND RETRIEVE TRAFFIC DELINEATORS

REFERENCE TO RELATED APPLICATIONS

A) This utility application is a continuation-in-part of the following utility applications, namely:
1) Ser. No. 16/132,376 filed Sep. 15, 2018 entitled OVER-CAB RACK FOR TRAFFIC DELINEATORS; and
2) Ser. No. 15/913,562 filed Mar. 6, 2018 entitled ROADWAY WORK AREA SAFETY TRUCK.

B) This utility application also claims the benefit of filing dates of the following provisional applications, namely:
1) The Mar. 5, 2018 filing date of provisional application Ser. No. 62/638,818 entitled TRUCK MODULE FOR ASSISTING WORKMEN TO PLACE AND RETRIEVE TRAFFIC DELINEATORS ALONGSIDE HIGHWAY WORK SITES (referred to hereinafter as a Primary Provisional Application);
2) The Feb. 18, 2018 filing date of provisional application Ser. No. 62/631,840 entitled TRUCK MOUNTABLE OVER-CAB RACK FOR TRANSPORTING NESTED STACKS OF BARREL-TYPE TRAFFIC DELINEATORS (referred to hereinafter as a Secondary Provisional Application).

C) Reference also is made to a utility application Ser. No. 15/197,685 filed Jun. 29, 2016 entitled ALL IN ONE SAFETY DISPLAY, from which both of the utility applications identified above were filed as continuations-in-part, which utility application Ser. No. 15/197,685 claimed the benefit the Jun. 29, 2015 filing date of provisional application Ser. No. 62/186,036.

D) The disclosures of ALL of the utility and provisional applications identified above are incorporated herein, in their entireties, by reference.

BACKGROUND

So-called "traffic delineators" (also known as "traffic delineation safety markers") are well known that are positioned at spaced locations alongside roadway work zones to define lines of demarcation that separate the work zones from roadway lanes where traffic often is maintained while construction and repair work may be undertaken within the work zones.

Most traffic delineators in present-day use are formed from relatively lightweight plastic materials that have hollow, upstanding configurations that narrow as they extend upwardly, thereby permitting identically configured delineators to be nested one atop another to form nested stacks.

One common configuration of present-day traffic delineator takes the form of such hollow barrel-like members as are disclosed in the seventeen patents that follow—namely U.S. Pat. Nos. 8,794,172, 6,786,673, 6,478,505, 6,019,542, 5,868,520, 5,234,280, 5,201,599, 4,973,190, 4,710,053, 4,674,431, 4,083,033, 3,952,690, D-486,089, D-481,965, D-243,075, D-243,073 and D-229,784, the disclosures of which are incorporated herein, in their entireties, by reference.

The barrel-like traffic delineators disclosed in the seventeen patents listed just above have closed, relatively small diameter upper end regions, with stepped diameter, or tapered sidewalls that depend to relatively large diameter, open bottom end regions that permit identical ones of the barrel-like delineators to be stacked one atop another to form nested stacks that often are transported atop the flatbeds of commercially available flatbed trucks.

The present invention assists with the safe placement and retrieval of barrel-like traffic delineators such as are disclosed in the seventeen patents listed just above; however, those who are skilled in the art will appreciate that the present invention can also be used to assist with the safe placement and retrieval of other types of traffic delineators such as the hollow, generally conical, stepped diameter delineators that are disclosed in U.S. Pat. Nos. 6,182,600, D-406,543 and D-338,631, and the tapered, upwardly pointing conical delineators (commonly called "traffic cones"), such as is disclosed in U.S. Pat. Nos. 4,925,334, 4,219,141 and 3,788,268, the disclosures of all of which patents are incorporated herein, in their entireties, by reference. Most of these various types of traffic delineators can be transported in nested stacks, such as are shown in FIG. 4 of U.S. Pat. No. 4,925,334.

Although the task of placing even large, heavy and awkward-to-grasp-lift-and-move barrel-like traffic delineators alongside roadway work zones can be rendered less dangerous:

1) IF the workperson who is to place traffic delineators at spaced intervals alongside a roadway work zone performs the placement while standing on a lower platform of a properly designed and constructed so-called "man basket" where the workperson is adequately guarded, restrained, and/or otherwise prevented from accidentally falling from a crash truck or safety truck type of flatbed vehicle while the vehicle is moving alongside the roadway work zone where traffic delineators are to be placed; and 2) IF a convenient-to-reach, near-knee-height surface is provided beside where the workperson is standing in the man basket so that traffic delineators placed atop the near-knee-height surface are easily grasped by the workperson and then placed (with minimal twisting and bending body movement) at spaced locations alongside the roadway work zone.

Likewise, the task of retrieving barrel-like traffic delineators from spaced locations alongside a roadway work zone also can be rendered less dangerous:

1) IF the workperson who is to retrieve traffic delineators from spaced intervals alongside a roadway work zone performs the retrieval of the traffic delineators while standing on a lower platform of a properly designed and constructed so-called "man basket" where the workperson is adequately guarded, restrained, and/or otherwise prevented from accidentally falling from a crash truck or safety truck type of flatbed vehicle while the vehicle is moving alongside the roadway work zone where traffic delineators are to be placed; and 2) IF a convenient-to-reach, near-knee-height surface is provided beside where the workperson is standing in the man basket so that traffic delineators retrieved from the roadway work surface can be placed atop the near-knee-height surface where workpersons standing atop the flatbed can lift the traffic delineators to atop the flatbed, without the workperson standing in the man basket needing to twist, turn and bend to any significant extent.

A proposal that was offered prior to the year 2000 that was intended to address at least some of the dangerous concerns that are associated with the placement of traffic delineators alongside of, and the retrieval of traffic delineators from alongside of roadway work zones, is presented in U.S. Pat. No. 6,183,042 issued Feb. 6, 2001 to Albert Unrath, the disclosure of which patent is incorporated herein, in its entirety, by reference.

The Unrath proposal (as depicted in drawings of the Unrath patent) provides a stand-on platform located at the base of quite a relatively tall compartment wherein a workperson is intended to stand, with a waste-high safety chain being draped across the front of the compartment to retain the workperson in the compartment especially when, for example, he or she must lean forward to perform the tasks of putting down, and picking up, traffic delineators to and from spaced locations alongside a roadway surface.

Although the Unrath proposal attempts to address at least some aspects of the safety concerns associated with the placement and retrieval of traffic delineators to and from spaced locations alongside a roadway work zone, the Unrath proposal tends to raise more safety concerns than it cures.

For example, one significant safety concern presented by the Unrath proposal is that the only vehicle surface (as shown in the drawings of the Unrath patent) that can be utilized to support traffic delineators prior to the placement of traffic delineators alongside, and following the retrieval of traffic delineators from alongside a roadway work zone, is an above-waist-high vehicle surface that has only a small surface area located beside, and only a somewhat larger traffic delineator support surface in an area extending behind where a workperson stands while in the tall compartment provided by Unrath.

What Unrath's awkwardly-placed, above-waist-high vehicle surface (for supporting traffic delineators) requires is that:

1) IF a workperson standing in the tall compartment of Unrath is to repetitively place large, relatively heavy and awkward-to-handle barrel-like traffic delineators one after another at locations spaced alongside a roadway work zone, he or she must first turn his or her body more than ninety degrees before reaching up to grasp, and then to lift, each barrel-like delineator, one-at-a-time from where it resides on the above-waist-high vehicle surface—whereafter he or she must then reverse-turn his or her body to move each newly grasped and raised delineator more than ninety degrees before then leaning over the waste-high safety chain to lower the relatively large, heavy and awkward-to-handle barrel-like traffic delineator onto a newly chosen spaced location alongside a roadway work zone—while, at the same time, the vehicle on which the workperson is being carried, moves alongside the roadway work zone; and 2) IF a workperson standing in the tall compartment of Unrath is to repetitively retrieve the large, relatively heavy and awkward-to-handle barrel-like traffic delineators from spaced locations alongside a roadway work zone, he or she must first lean over the waste-high safety chain of Unrath to grasp and lift each delineator up and over the waist-high safety chain, and then the workperson must turn his or her body more than ninety degrees while leaning back to turn and move each delineator that has been lifted over the safety chain to an even higher height to overlie the above-waist-high vehicle surface—whereafter the workperson must then lower each of the raised delineators, one at a time, onto the above-waist-high vehicle surface—before then turning back to face a next-to-be-retrieved traffic delineator that is located alongside the work zone being followed by the vehicle that carries the workperson.

All of this repetitive lifting, lowering, leaning and turning of the workperson's body unquestionably severely stresses the back and body of a workperson who has been assigned to perform these various movements time after time. When a workperson has had to perform these duties to place and/or to retrieve hundreds of traffic delineators one-at-a time during a typical workday, the workperson's back and body has almost always become painful, and his or her muscles often have been strained.

Such activities performed repetitively from a relatively tall compartment in a moving vehicle can also render a workperson likely to become dizzy and/or to fall from the compartment that is guarded only by a waste-high safety chain draped across the front of the compartment.

SUMMARY OF THE INVENTION

The present invention relates to safety modules that have left-side and right-side embodiments (which are mirror images of each other) that can be incorporated into insets provided substantially midway along opposite left-side and right-side regions of the flatbeds of such trucks as are commonly used to transport and store barrel-like traffic delineators that are being placed at spaced locations alongside roadway work zones, and that are being retrieved from spaced locations alongside roadway work zones. Such flatbed trucks are commonly known as "crash trucks" because they usually tow a crash force attenuator to protect the rear of the truck, and to minimize the damage and injuries that may occur when a vehicle slams accidentally into the attenuator.

Because barrel-like traffic delineators are widely used in many regions of the United States, and because barrel-like traffic delineators are the type of traffic delineators that are almost always more sizable and more awkward to handle than are traffic delineators of other types and configurations, the modular units of the present invention are especially designed to safeguard workpersons who are tasked to place and/or to retrieve even the large, relatively heavy, and often awkward-to-handle barrel-like traffic delineators that are in wide use throughout the United States.

Safety modules that embody the preferred practice of the present invention are configured to be easily incorporated into insets provided mid-way along right and left sides of the flatbeds of a wide variety of flatbed trucks, including so-called crash trucks.

DETAILED DESCRIPTION

Figure 1:
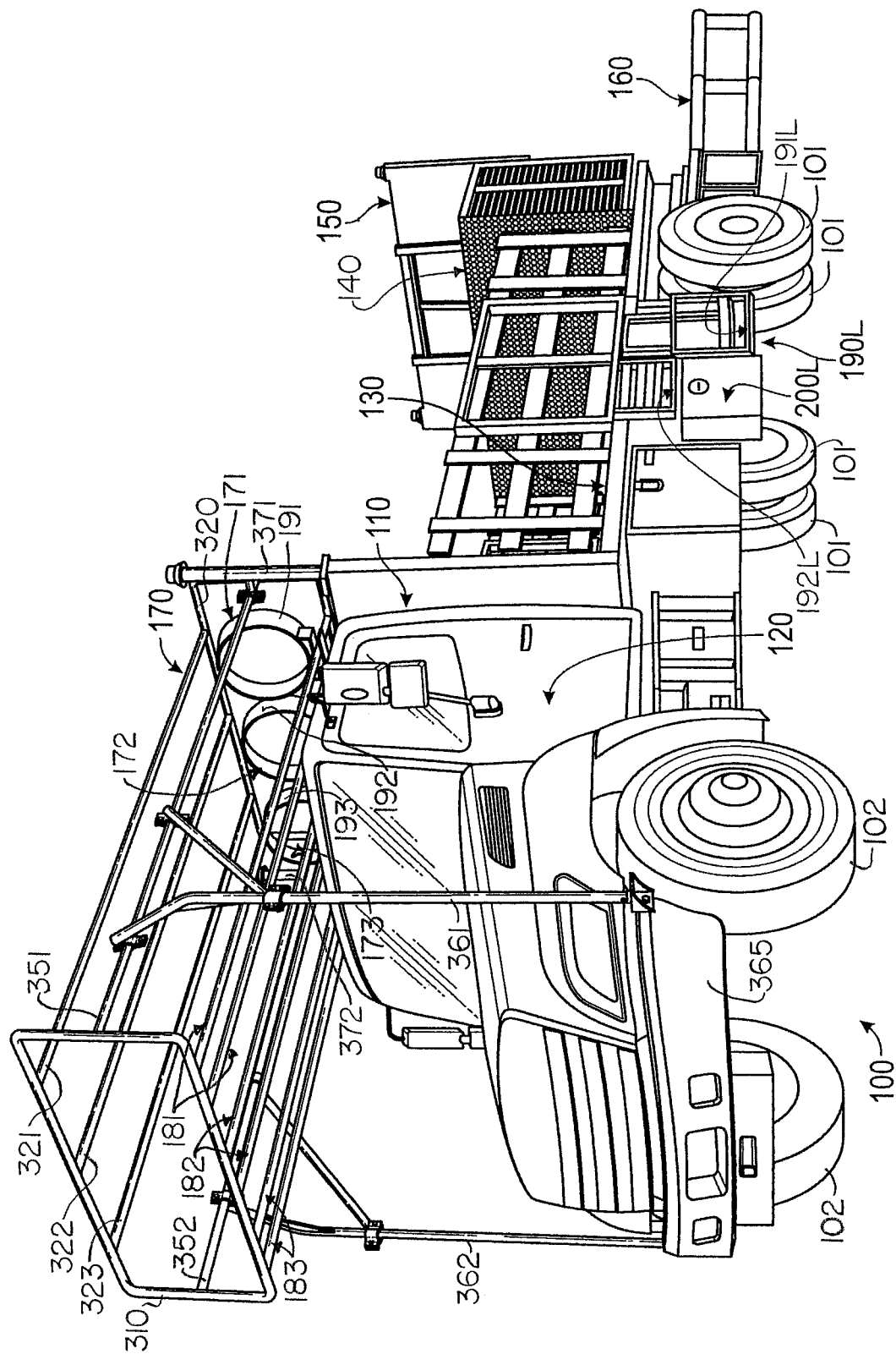
FIG. 1 is a perspective view showing the left side (i.e., the driver's side) of a conventional, commercially available, flatbed truck that is provided with an over-cab rack (such as is disclosed in the previously referenced Secondary Provisional application) for transporting a plurality of horizontally extending nested stacks of barrel-like traffic delineation safety markers, with the view also showing 1) a commercially available crash truck attenuator extending rearwardly from the truck, 2) an electronic warning sign board (carried at the rear of the flatbed of the crash truck) that is shown in a raised position, and 3) a left-side "man basket" module installed in an inset in the flatbed, embodying one form of the present invention.
Figure 2:
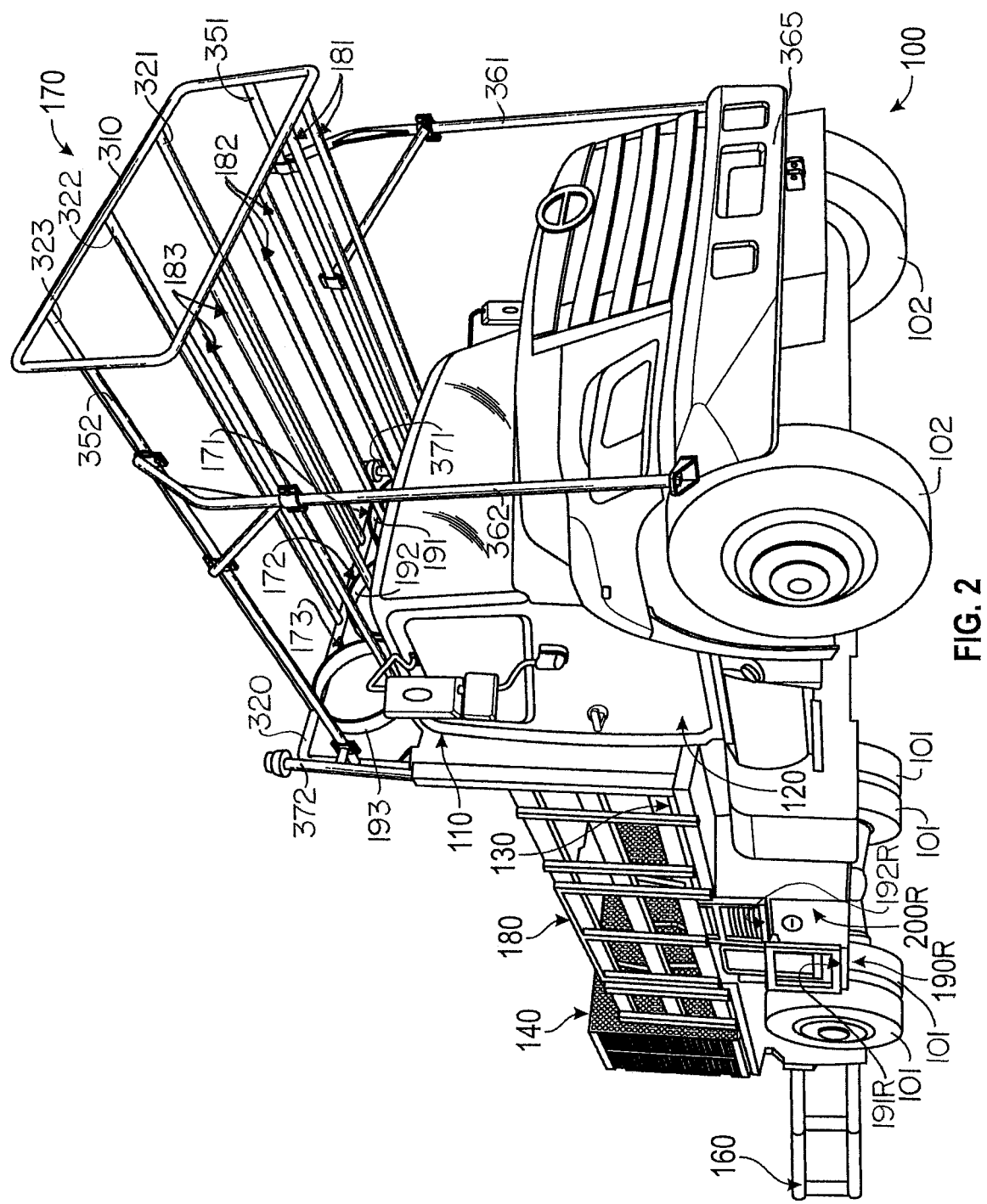
FIG. 2 is a perspective view of the right side of the crash truck of FIG. 1, with the electronic sign board lowered to an out-of-view position, with the view showing a right-side module of "man basket" that is a mirror-image reversal of the left-side "man basket" module depicted in FIG. 1.

FIG. 1 shows the left side of a so-called "crash truck" or "safety truck" 100 that has a flatbed 130, and FIG. 2 shows the right side of the same so-called "crash truck" or "safety truck" 100. If more details of the "crash truck" or "safety truck" 100 are desired, they can be found in referenced utility application Ser. No. 15/913,562.

The truck 100 has tandem rear wheels on which are mounted rear tires 101, and steerable front wheels on which are mounted front tires 102. The truck 100 also has a conventional cab 110, which has the usual right-side and left-side cab access doors, that are indicated by the numeral 120 in each of FIGS. 1 and 2.

Figure 7:
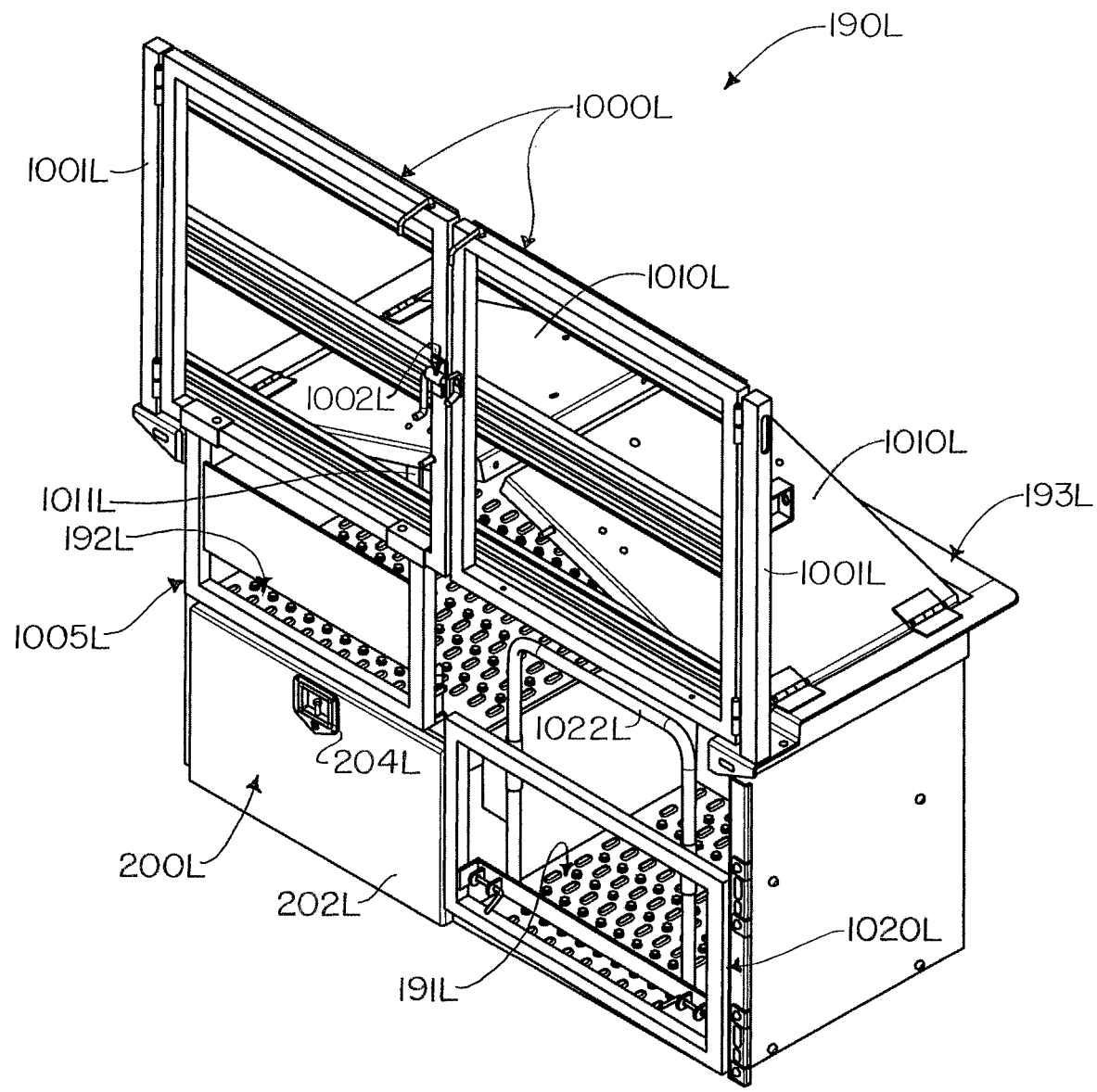
FIG. 7 is a perspective view, on the same enlarged scale as FIG. 3, of a left-side man basket module that is a mirror-image-reversal of the right-side module.

Overview of the Truck 100:

In overview, and continuing to refer to FIGS. 1 and 2, the flatbed 130 of the truck 100 can be used to haul various forms of cargo (not shown) that frequently includes a supply of such barrel-like traffic delineators as are disclosed in the referenced 17 patents, and in FIG. 7 of the referenced Secondary Provisional application Ser. No. 62/631,840, as well as referenced utility application Ser. No. 16/132,376.

An optional storage compartment 140 is provided at the rear of the flatbed 130. FIG. 1 also shows an optional, rearwardly facing, electronic sign board 150 located at the rear of the flatbed 130 of the truck 100. In FIG. 1 the sign board 150 is shown in an elevated position that permits what is displayed on the rearwardly-facing sign board to be viewed by motorists who approach the truck 100 from behind the truck 100.

In FIG. 2, the electronic sign board 150 is not seen because the sign board has been lowered to an out-of-view storage position that is hidden, at least in part, by the optional storage compartment 140.

Referring still to FIGS. 1 and 2, an optional, commercially available crash attenuator unit 160 is shown connected to, and extending rearwardly from, the rear of the truck 100. When the sign board 150 shown in FIG. 1 is lowered to an out-of-view storage position (where the electronic sign board 150 cannot be seen, as in FIG. 2), the electronic sign board 150 is then moved out of a path of travel that is followed by components of the crash attenuator unit 160 when components of the crash attenuator unit 160 fold upwardly and forwardly to a transport position (not shown by the drawings of the present document) where components of the crash attenuator unit 160 overlie not only the optional storage compartment 140 but also a rear part of the flatbed 130 of the truck 100.

One embodiment of the crash attenuator unit 160 is depicted in much greater detail in FIG. 1 of U.S. Pat. No. 9,399,845. How components of the crash attenuator 160 can fold both upwardly and forwardly to the transport position mentioned just above is shown in FIGS. 1A-1B of U.S. Pat. No. 8,322,945. The disclosures of both of these patents are incorporated herein, in their entireties, by reference.

Returning, once again, to FIGS. 1 and 2, it can be seen that an optional rack structure 170 overlies the cab 110 of the truck 100. This rack structure 170 is the subject of referenced provisional application Ser. No. 62/631,840 and referenced utility application Ser. No. 16/132,376.

At substantially identical left-side and right-side locations just forward of the rear tires 101 of the truck 100, are left-side and right-side modules 190L and 190R, respectively, that are the subject of the present application. As will be explained, the modules 190L and 190R are provided to assist workpersons to safely place, and to safely retrieve, traffic delineators to and from spaced locations alongside roadway work zones as the truck 100 moves alongside the work zones while carrying a workperson in one of the compartments defined by one of the modules 190L/190R, as will be explained.

The left-side and right-side modules 190L/190R shown in FIGS. 1 and 2 are principally depicted to illustrate typical locations midway along opposite sides of a conventional flatbed truck 100 where such modules as embody the present invention can be positioned, and put to use. Accordingly, any differences in appearance between the modules 190L/190R shown in FIGS. 1 and 2 and the preferred forms of the modules 190L/190R shown in the remainder of the drawing views of this application are to be ignored.

Overview of the Over-Cab Rack Structure 170:

So the reader can easily turn to the previously referenced provisional application Ser. No. 62/631,840 and follow-on utility application Ser. No. 16/132,376 for a more complete understanding of components and features of the over-cab rack structure 170, the reference numerals that appear in FIGS. 1 and 2 of the present application that refer to components and features of the rack structure 170 are the same reference numerals that are used in the referenced provisional and utility application Ser. Nos. 62/631,840 and 16/132,376 to designate the same components and features of the rack structure 170.

As is explained in the referenced provisional application Ser. No. 62/631,840 and follow-on utility application Ser. No. 16/132,376, and as is shown in each of FIGS. 1 and 2 of the present application:

1) The rack structure 170 includes three identical rack assemblies 171, 172, 173 that extend in parallel, side-by-side, relationship, with each of the rack assemblies including a pair of straight, parallel-extending, rails that are indicated by the numerals 181, 182, 183, respectively.

2) Each of the pairs of rails 181, 182, 183 slidably supports one of three identically configured hoop assemblies 191, 192, 193, respectively, that can be slided freely back and forth along an associated pair of the elongate rails 181, 182, 183, respectively.

3) Each of the barrel racks 171, 172, 173 is configured to receive a separate nested stack of barrel-like traffic delineators, with a narrow end region of an uppermost one of the barrel-like traffic delineators of each nested stack being inserted into an associated one of the hoop assemblies 191, 192, 193, and with the largest end regions of each of the barrel-like traffic delineators of the associated nested stack of delineators being supported by an associated pair of the elongate rails 181, 182, 183—as is explained in connection with FIG. 7 of above-referenced Over-Cab Rack provisional and utility application of 62/631,840 and Ser. No. 16/132,376.

4) By this arrangement, a large number of barrel-like traffic delineators can be compactly stored and transported in the form of three nested stacks of the barrel-like traffic delineators that extend side-by-side, with each of the nested stacks being supported by one of the hoop assemblies 191, 192, 193, and by an associated pair of the elongate rails 181, 182, 183, respectively, of the rack structure 170—which leaves much, if not most, of the flatbed 130 of the truck 100 open and available for use by workpersons who move about on the surface of the flatbed 130 of the truck 100 as they feed traffic delineators into, and remove traffic delineators from, the over-cab rack structure 170.

5) As can be seen in one or the other of FIG. 1 or 2, the rack structure 170 is rendered structurally sound by virtue of the pairs of rails 181, 182, 183 having their opposite end regions welded to identically configured front and rear rectangular structures 310, 320, respectively, that are provided at opposite front and rear end regions of the rack structure 170. Moreover, the rack structure 170 is strengthened by elongate members 191, 192, 193 that overlie the barrel racks 171, 172, 173, respectively. The elongate members 191, 192, 193 help to retain nested stacks of delineators in place in each of the barrel racks 171, 172, 173, respectively—it being noted that the elongate members 191, 192, 193 have their opposite front and rear end regions welded to the front and rear rectangular structures 310, 320, respectively.

6) To support the rack structure 170 atop the cab 110 of the truck 100, the rack structure 170 is also provided with a pair of forwardly-rearwardly extending tubular members 351, 352 that extend between the front and rear rectangular structures 310, 320 at locations above the left and right sides, respectively, of the cab 110 of the truck 100. Also, left and right upwardly extending supports 361, 362 are provided that connect with a front bumper 365 of the truck 100, and with the left and right tubular members 351, 352, respectively. Additionally, left and right upwardly extending supports 371, 372 are provided that connect with rear regions of the left and right tubular members 351, 352, respectively. By this arrangement, the rack structure 170 is securely supported as it overlies the cab 110 of the truck 100.

Overview of the Modules 190L/190R:

To simply the description that follows, when corresponding left-side and right-side components XXXL and XXXR are being referred to, a simplified statement such as "the components XXXL/XXXR" is often be used. This eliminates the need to use a longer, more formal statement such as "the left-side and right-side components XXXL and XXXR, respectively, that correspond to each other."

Although this section of the present application is principally intended to refer to the left-side man basket module 190L as depicted in FIG. 1, and to the right-side man basket module 190R as depicted in FIG. 2, what is said in this section of the application is applicable to the preferred forms of the left-side module 190L and the right-side module 190R that are shown in various ones of FIGS. 3-14.

As can be seen in the left-side view provided by FIG. 1, and the right-side view provided by FIG. 2, each of the man basket modules 190L/190R has both a lower platform (that is indicated generally by an associated one of the numerals 191L/191R), and an upper platform (that is indicated generally by an associated one of the numerals 192L/192R).

It is important, for reasons of safety, that the lower and upper platforms 191L/191R and 192L/192R, respectively, of the modules 190L/190R have at least certain minimal dimensions that permit the man basket modules and their lower and upper platforms to safely serve their intended purposes. In preferred practice, the man basket modules 190L/190R and their lower and upper platforms 191L/191R and 192L/192R, respectively, are at least dimensionally sized in the following ways:

1) Each of the man basket modules 190L/190R preferably have widths of no less than about 48 to about 60 inches, as measured from left to right (i.e., forwardly and rearwardly with respect to the truck on which the modules are installed), and preferably have depths of at least 24 inches deep, as measured from front to rear (i.e., from left to right with respect to the truck on which the modules are installed).

2) Each of the lower platforms 191L/191R is preferably no less than about 24 to 30 inches wide, as measured from left to right (forwardly and rearwardly with respect to the truck on which the modules are installed), and is preferably no less than about 24 inches deep, as measured from front to rear (from left to right of the truck on which the modules are installed). In preferred practice, the lower platforms are generally rectangular and measure no less than about 24 inches by 24 inches.

3) Each of the upper platforms 192L/192R is preferably no less than about 24 to 30 inches wide, as measured from left to right (forwardly and rearwardly with respect to the truck on which the modules are installed), and is preferably no less than about 24 inches deep, as measured from front to rear (from side to side of the truck on which the modules are installed). In preferred practice, the upper platforms are generally rectangular and measure no less than about 24 inches by 24 inches.

4) Each of the upper platforms 192L/192R is preferably located at a height that is approximately eighteen inches above the height of the associated one of the two lower platforms 191L/191R—which is a height that selected to be substantially equal to, or slightly lower than, the "knee heights" of average workpersons who will stand on one of the lower platforms 191L/191R while in one of the man basket compartments 195L/195R provided by an associated one of the man basket modules 190L/190R.

5) In preferred practice, the upper platforms are located approximately midway between the heights of the lower platforms and the flatbeds of the trucks on which the modules are installed. These upper level platform heights have been found to render it relatively easy—

A) for a workperson standing in one of the compartments 195L/195R to grasp and move even large, heavy-and-awkward-to-grasp-and-move barrel-like traffic delineators one at a time from one of the upper platforms 192L/192R onto a roadway surface;

B) for a workperson standing in one of the compartments 195L/195R to grasp and place one of the large, heavy-and-awkward-to-grasp-and-to-place barrel-like traffic delineators that have been retrieved one at a time from a roadway surface onto one of the upper level platforms 192L/192R; and C) for a workperson who occasionally needs to transition up or down between one of the lower level platforms 191R/191L and a nearby portion of the flatbed 130 of the truck 100, to use one of upper level platforms 192L/192R as a step surface while moving between one of the lower level surfaces 191L/191R and the flatbed surface 130 of the truck 100.

Figure 11:
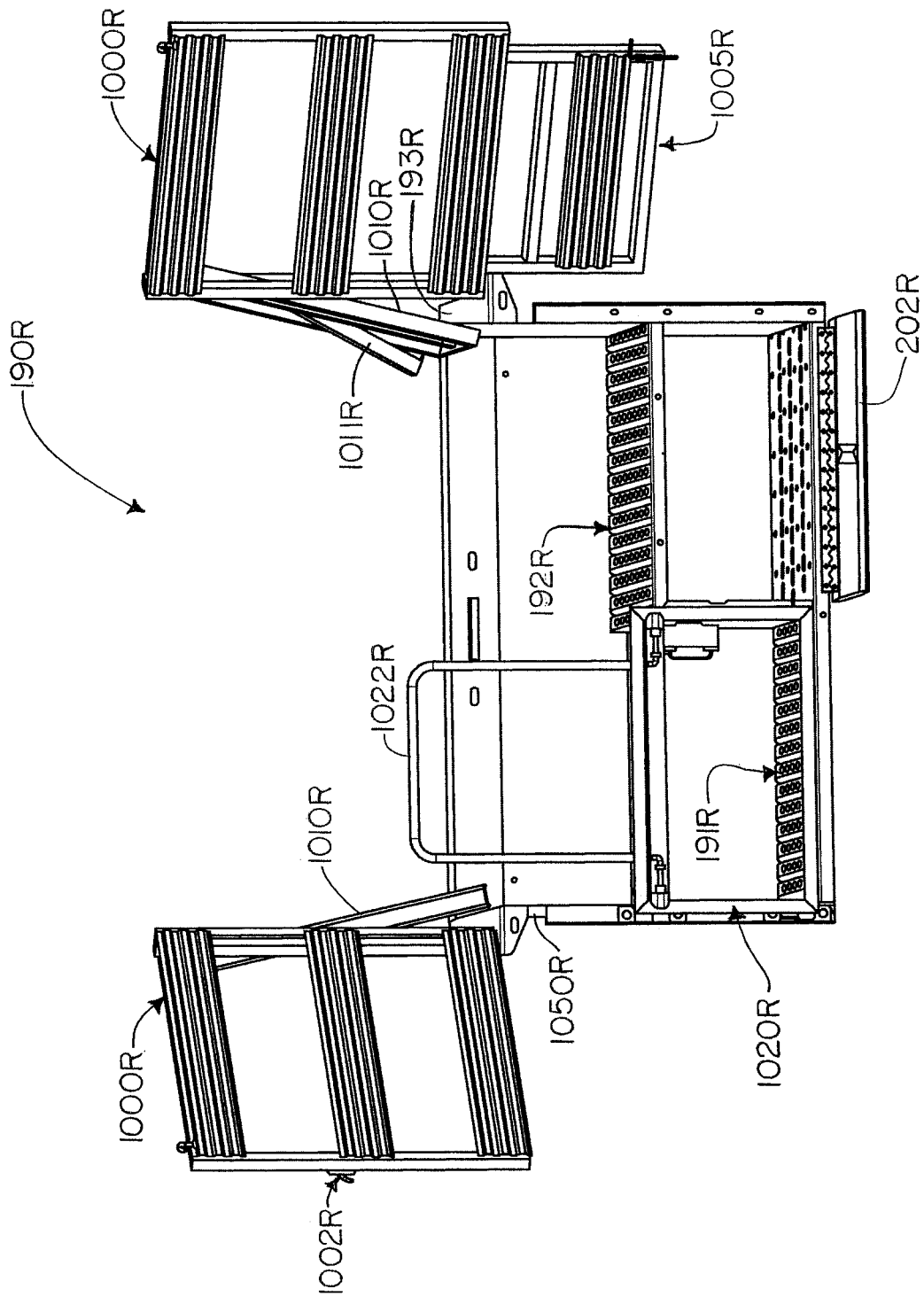
FIG. 11 is yet another perspective view of the right-side man basket module, but with certain of the movable components of the right-side man basket module moved to open positions and/or slided upwardly.

5) As can also be seen in FIGS. 1 and 2, the upper level platforms 192L/192R are preferably located atop tool boxes 200L/200R that also form components of each of the modules 190L/190R. The tool boxes 200L/200R have pivotally mounted front doors 202L/202R that are each provided with a suitably configured latch assembly 204L/204R. When one of the latch assemblies 204L/204R is operated to unlatch an associated one of the front doors 202L/202R, the unlatched front door is permitted to pivot downwardly to an open position such as is depicted in FIG. 11.

Housings that form the opposed, upstanding side walls, and the rear walls of each of the modules 190L/190R are best shown in various ones of FIGS. 3, 5-6 and FIGS. 7, 9-10, where these housings are indicated generally by the numerals 1050L/1050R.

How the Modules 190L/190R are Ordinarily Put to Use:

During normal placement and retrieval of traffic delineators to and from roadway surfaces alongside which trucks 100 such as are shown in FIGS. 1 and 2 are being driven so that workpersons carried on the flatbed 130 and on one of the lower level platforms 191L/191R of an associated one of the man basket modules 190L/190R can work in harmony to take advantage of the facts that:

1) The upper level platforms 192L/192R provide sizeable support surfaces where barrel-like traffic delineators can be temporarily placed, one at a time, while these typically cumbersome, relatively large, heavy and awkward-to-grasp-and-move delineators are in the process of being moved up or down, to and from the flatbed 130 of the truck 100 (while the truck 100 that is carrying at least one workperson on he truck's flatbed 130, and one workperson standing on one of the lower level platforms 191L/191R) moves alongside a roadway work zone where barrel-like traffic delineators are either to be put down at spaced locations alongside the roadway work zone, or are to be picked up from spaced locations alongside the roadway work zone.

2) When the delineators are to be placed on a roadway road surface at spaced locations alongside a roadway work zone, the delineators are first moved, one at a time, (by a workperson who is standing on the flatbed 130 of the truck 100) from the flatbed 130 of the truck 100 to one of the upper level platforms 192L/192R of one of the modules 190L/190R, whereafter the delineators are moved, one at a time, by a workperson who is standing on an associated one of the lower level platforms 191L/191R onto the roadway road surface alongside which the truck 100 is being driven.

3) When delineators are to be retrieved and collected from spaced locations alongside a roadway work zone, a workperson standing on one of the lower level platforms 191L/191R lifts each of the delineators, one at a time, from the roadway surface, and places the retrieved delineators, one at a time, onto an associated one of the upper level platforms 192L/192R, whereafter another workperson who is standing on the flatbed 190 of the truck 100 lifts each of the delineators, one at a time, from the upper level platform 192L/192R and places the delineator on the flatbed of the truck 100, whereafter the barrel-like delineators may be inserted into the over-cab rack 170 in a manner that is described, illustrated and explained in the previously referenced provisional and utility applications.

Among the significant advantages that are provided by the modules 190L/190R is that relatively little repetitive lifting, lowering, twisting and turning needs to be performed by the bodies of either of the workpersons who are standing on the flatbed 130 of the truck 100, or on a lower level platform 191L/191R of one of the modules 190L/190R while performing such activities as are explained just above. The presence and the use that is made of the sizable upper level platforms 192L/192R to receive traffic delineators one at a time minimizes the amount of lifting and lowering of traffic delineators that each of these workpersons must perform—and the location of the sizeable upper level platforms 192L/192R at a near knee height minimizes the amount of lifting, twisting and turning that a workperson who is standing on one of the lower level platforms 191L/191R must perform while placing retrieved traffic delineators onto, and while taking traffic delineators from, one of the two upper level platforms 192L/192R.

Turning to the Modules 190L/190R as Shown in FIGS. 3-14:

Before turning to the preferred forms of the modules 190L/190R that are shown in various ones of FIGS. 3-14), it should first be noted that:

1) FIGS. 3-5 and FIGS. 11-14 show components and features of a preferred form of the right-side module 190R, wherein—

Figure 3:
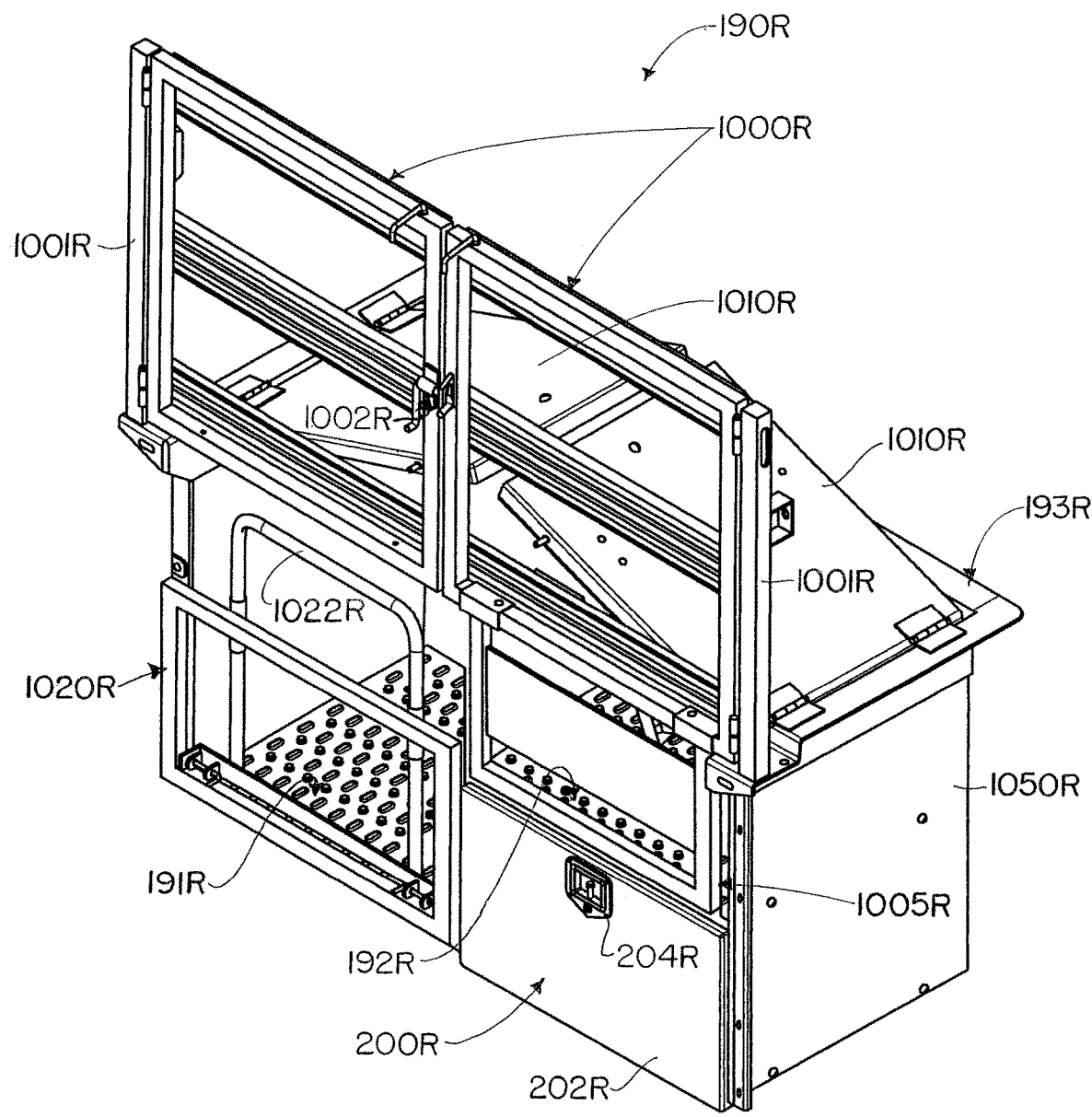
FIG. 3 is a perspective view, on an enlarged scale, of a more preferred form of the right-side man basket module, with the view showing all but two of the module's movable components in their closed and/or lowered positions.
Figure 4:
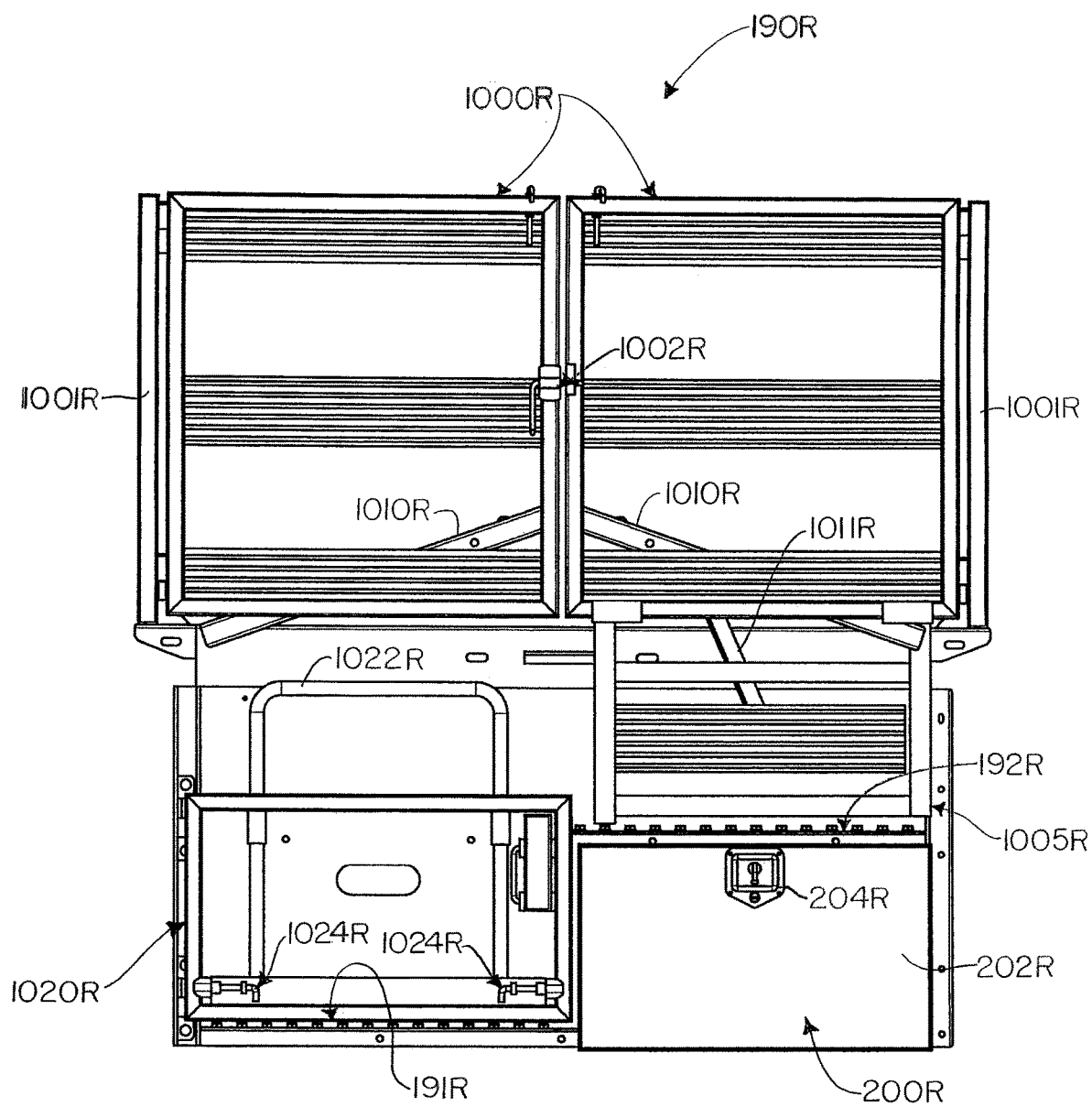
FIG. 4 is a front elevational view of the right-side man basket module.
Figure 5:
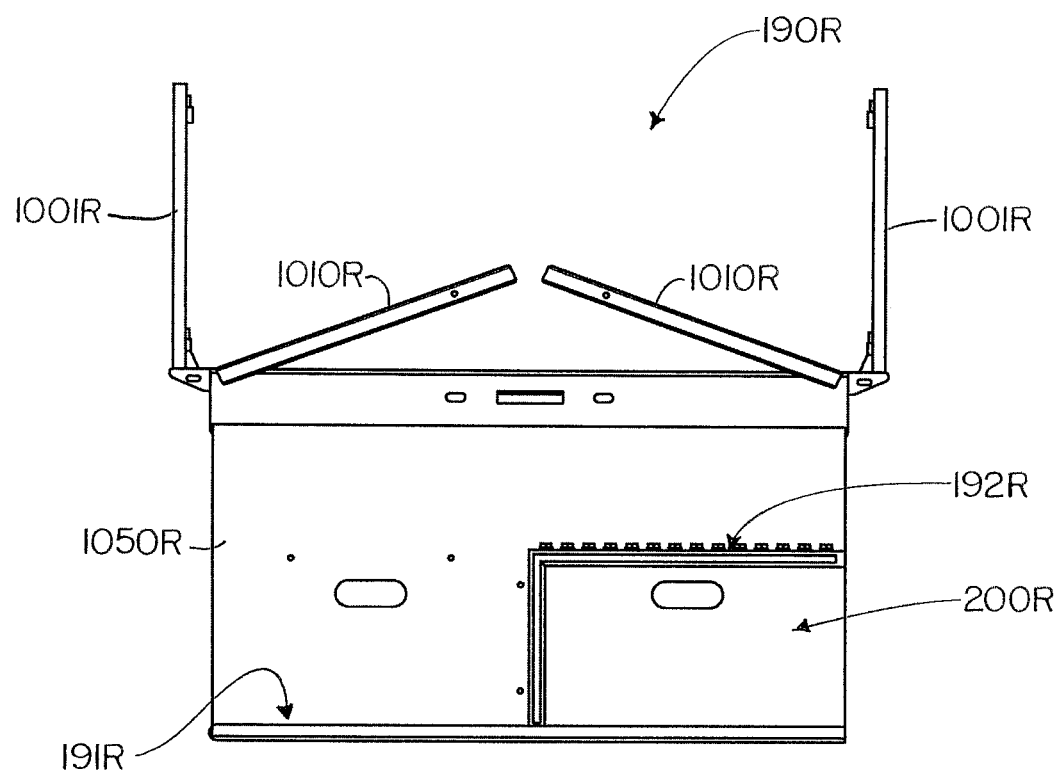
FIG. 5 is a front elevational view showing the right-side man basket module with many of the module's front components removed so that other components of the man basket module can be seen.
Figure 6:
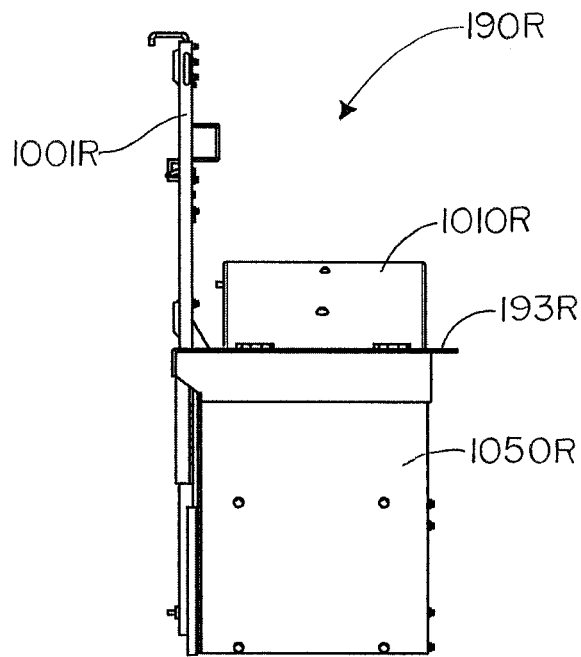
FIG. 6 is a right end elevational view of the right-side man basket module.

FIGS. 3 and 4 show many of the movable components of the right-side module 190R in their "closed" and/or "lowered" positions, whereas FIG. 11 shows most of the movable components of the module 190R in their "open" and/or "raised" positions, and 2) FIGS. 6-10 show components and features of a preferred form of the left-side module 190L—it being understood that the movable components of the left-side module 190L have appearances that are mirror image reversals of corresponding ones of the movable components of the right-side module 190R, as depicted in FIGS. 3-5 and 11-14.

Movable Components of the Modules 190L/190R:

Each of the right-side and left-side modules 190R/190L is provided with a corresponding set of pivotally and slidably movable components that provide access to various regions of the modules 190L/190R, as will now be explained:

1) Pivotally mounted safety gates 1000L/1000R that preferably each have a fence-like appearance are provided atop each of the right-side and left-side modules 190L/190R. These fence-like safety gates 1000L/1000R are pivotally connected to upstanding components 1001L/1001R (best shown in FIGS. 3-4 and 7-8) and can pivot from closed positions best shown in FIGS. 3-4 and 7-8, to open positions (such as is shown in FIG. 12) where the gates 1000L/1000R preferably extend closely alongside other fence-like guards that (as can be seen in FIGS. 1 and 2) extend along opposite right and left sides of the flatbed 130 at locations just forwardly of, and just rearwardly of, the modules 190L/190R.

Figure 12:
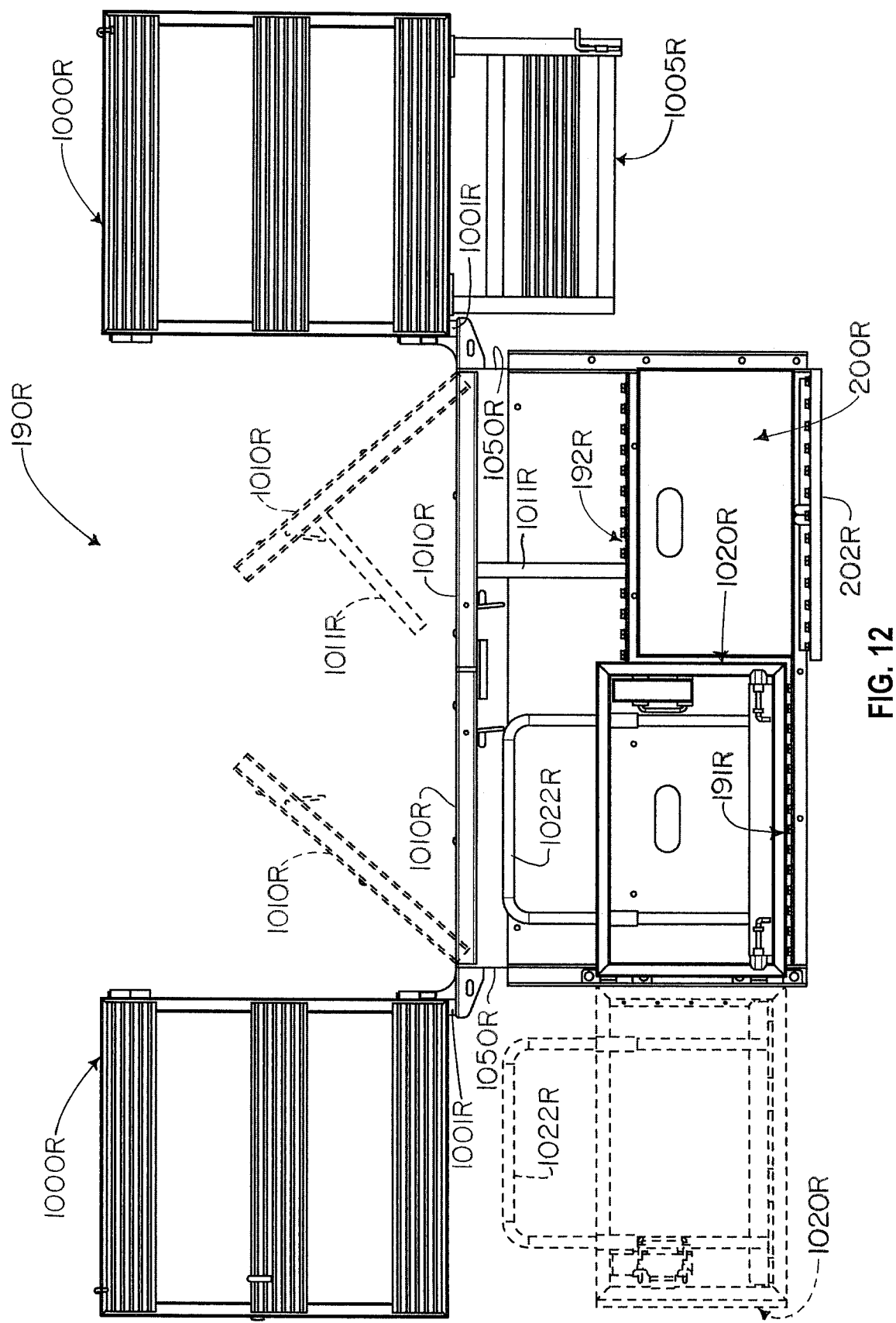
FIG. 12 is a front elevational view of the right-side man basket module, with broken lines depicting alternate positions of some of the movable components of the module.
Figure 13:
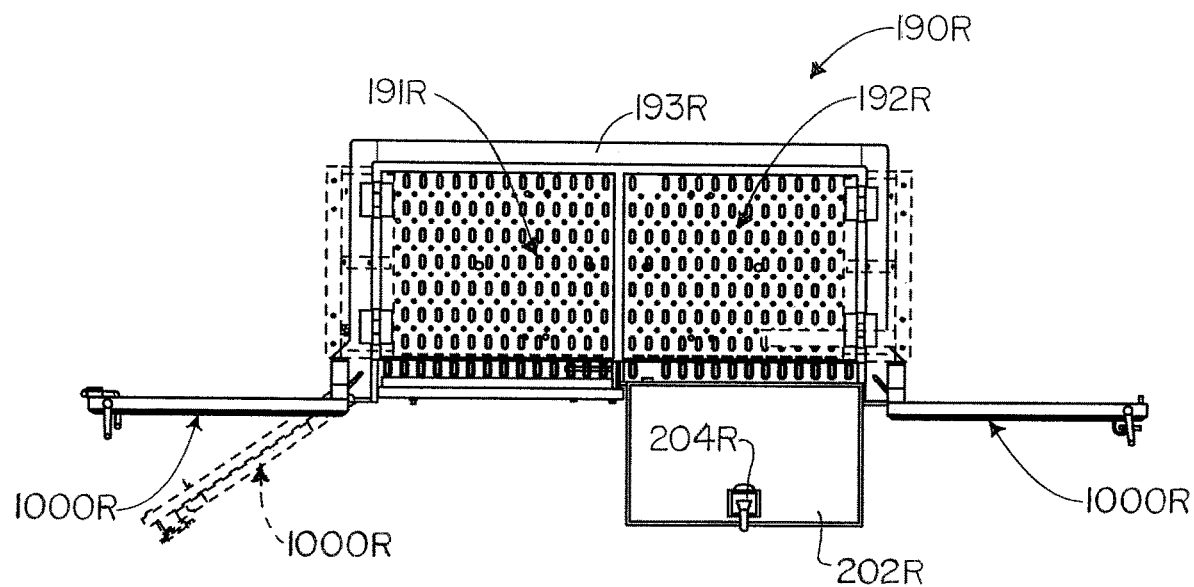
FIG. 13 is a top plan view of the right-side man basket module with some components removed, and with broken lines depicting alternate positions of other components.

Fully open positions of the right-side fence-like safety gates 1000R are shown in FIG. 12. Fully open positions of the left-side fence-like safety gates 1000L will be understood to have appearances that are mirror images of the right-side fence-like safety gates 1000R shown in FIG. 12.

Partially open positions of the right-side fence-like safety gates 1000R are shown in FIG. 11. Corresponding partially open positions of the left-side fence-like safety gates 1000L will be understood to have appearances that are mirror images of the right-side fence-like safety gates 1000R shown in FIG. 11.

Latch assemblies that are indicated generally by the numerals 1002L/1002R in FIGS. 3-4 and 7-8 are provided to releasably retain the right-side and left-side fence-like gates 1000L/1000R in their closed positions.

2) Depending extensions 1005L/1005R are provided on only one of each of the left-side and right-side fence-like gates 1000R/1000L.

A right-side fence-like safety gate 1000R that is provided with a depending extension 1005R is best shown in FIGS. 11 and 12. When closed, the right-side depending extension 1005R restricts access to, and visually blocks a view of, a region of the right-side module 190R that overlies the upper platform 192R of the right-side module 190R.

Figure 8:
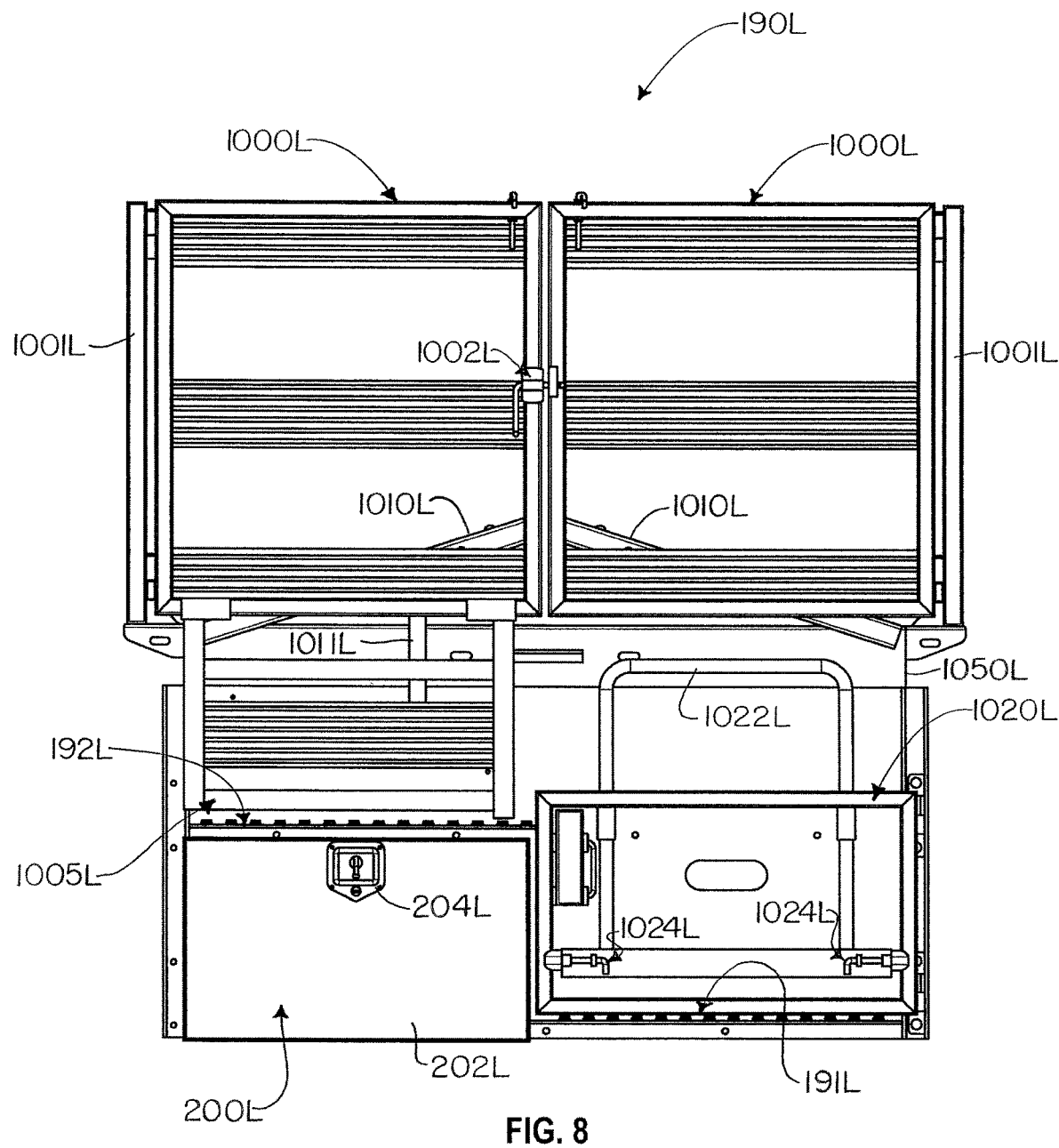
FIG. 8 is a front elevational view of the left-side man basket module.
Figure 9:
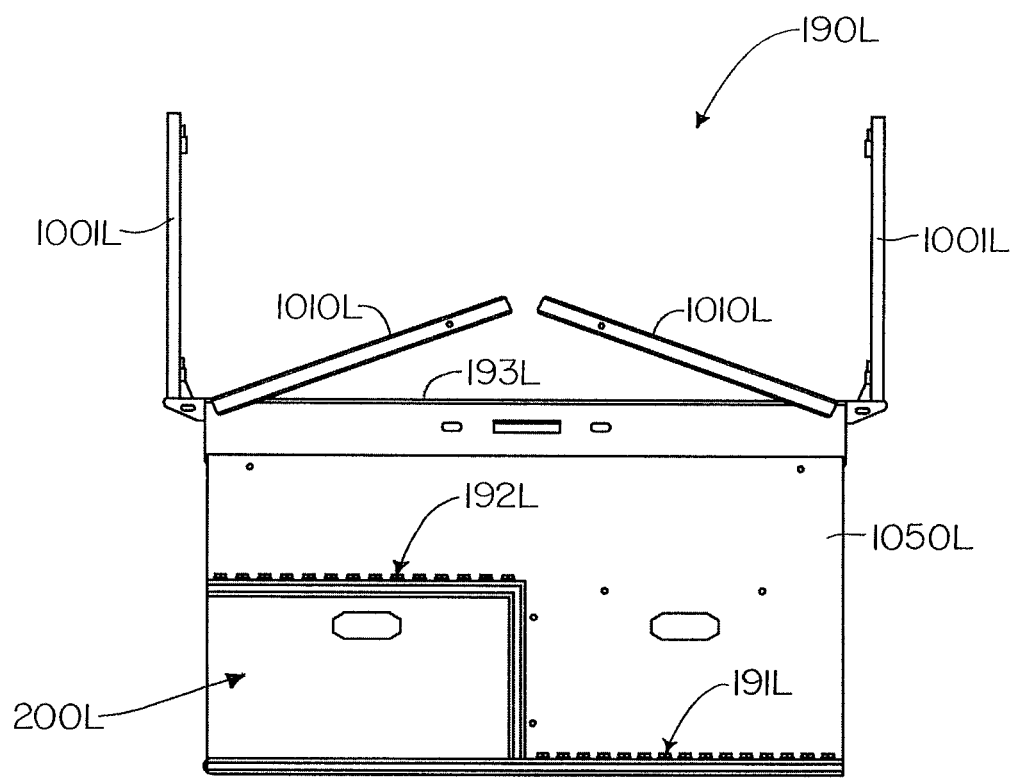
FIG. 9 is another front elevational view of the left-side man basket module, but with many of the front components of the module removed so that other components of the module can be seen.
Figure 10:
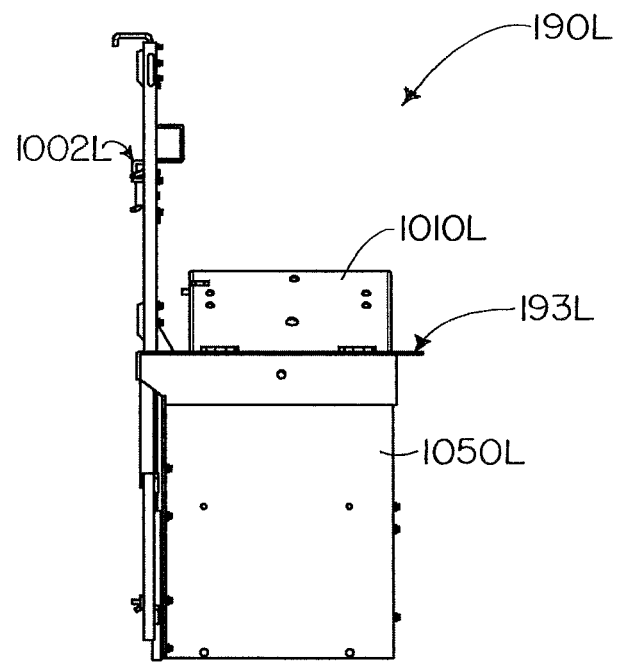
FIG. 10 is a right end elevational view of the left-side module.

A left-side fence-like safety gate 1000L that is provided with a depending extension 1005L (that corresponds to the right side depending extension 1005R) is best shown in FIG. 8. As can be seen in FIG. 8, when closed, the depending extension 1005L restricts access to, and visually blocks a view of, a region of the left-side module 190L that overlies the upper platform 192L of the left-side module 190L.

In the left-side view of FIG. 7, and in the right-side view of FIG. 3, depending extensions 1005L/1005R are shown that differ slightly in appearance from the appearances of the depending extensions 1005L/1005R shown in FIGS. 11-12 and 8, respectively. However, the depending extensions 1005L/1005R that are shown in FIGS. 3 and 7 perform in substantially the same manner as the depending extensions 1005L/1005R that are shown in FIGS. 11-12 and 8, respectively, to restrict access to, and to visually block views of, regions located just above the upper platforms that are designated by the numerals 192L/192R, when the fence-like gates 1000L/1000R that carry the left-side and right-side depending extensions 1005L/1005R are moved to closed positions by the gates 1000L/1000R that carry these left-side and right-side depending extensions.

Figure 14:
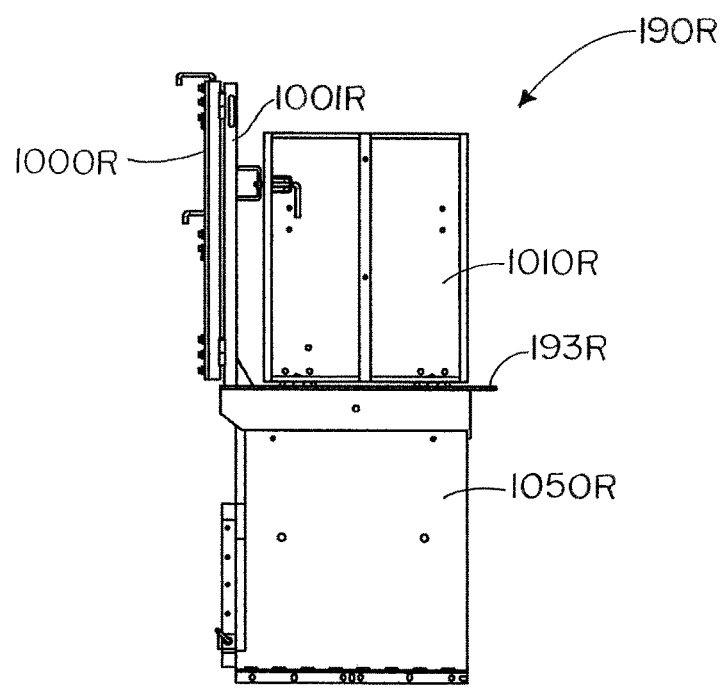
FIG. 14 is a right-end elevational view similar to FIG. 6, with selected components of the man basket module pivoted to open positions.

3) Referring to FIGS. 3 and 4, it can be seen that, located just behind the fence-like safety gates 1000R of the right-side module 190R are a pair of upwardly opening platform-like doors 1010R that can pivot from closed positions (wherein the platform-like doors 1010R provide upper surfaces that are substantially level with the upper surface of the flatbed 130 of the truck), to open positions wherein the platform-like doors 1010R extend substantially vertically and are latchingly retained by adjacent ones of the upstanding members 1001R (an example of which is shown in FIG. 14).

Corresponding platform-like doors 1010L of the left-side module 190L are shown in FIGS. 7 and 8. The left-side platform-like doors 1010L behave in the same way as the right-side platform-like doors 1010R, and have appearances that are mirror-image reversals of the right-side platform-like doors 1010R.

Closed positions of the platform-like doors 1010R are shown by solid lines in FIG. 12, while partially open positions of the platform-like doors 1010R are shown by solid lines in FIGS. 3, 4 and 11, and are indicated by broken lines in FIG. 12.

Flat surface plates 193R/193L are shown in FIGS. 3 and 7 to which the platform-like doors 1010R and 1010L are pivotally connected, respectively.

Each of the platform-like doors 1010R/1010L that overlies one of the upper level platforms 192L/192R pivotally carries a depending support 1011R/1011L that extends substantially vertically when the associated platform-like door 1010R/1010L is closed—to thereby support the associated platform-like doors 1010R/1010L in their fully closed positions.

4) Structurally strong guard assemblies 1020L/1020R extend in front of the compartments 195L/195R of the modules 190L/190R to securely retain workpersons within the compartments 195L/195R while performing such tasks as are explained above to place and retrieve barrel-like delineators to and from spaced locations alongside a roadway work zone.

The tubular guard assemblies 1020L/1020R can be unlatched and pivoted from the closed positions that are shown in FIGS. 3-4 and 7-8 (and by solid lines in FIG. 12), to an unlatched and fully open positions (an example of which is shown by broken lines in FIG. 12). Also, a tubular safety rail component 1022L/1022R of each of the guard assemblies 1020L/1020R can be unlatched and slided vertically upwardly to any of a progression of latchingly-retained heights, with a full-height position of one of the tubular safety rail components 1022L/1022R being shown in FIG. 11.

Latch assemblies that are provided to releasably retain the tubular safety rail guard assemblies 1022L/1022R in their raised and lowered positions are best shown in FIGS. 4 and 8, where these latch assemblies are indicated by the numerals 1024L/1024R, respectively.

The various movable components of the modules 190L/190R that are enumerated above provide guarded access to various regions of the modules 190L/190R to permit workpersons to selectively enter and leave various regions of the modules 190L/190R as may be needed, and to provide the latchable tubular safety rail components 1022L/1022R at heights that are appropriate for workpersons of differing heights to be safely retained within the compartments 195L/195R of the modules 190L/190R.

Although the invention has been described in a preferred form with particularity, it is understood that the present disclosure of the preferred form has been made only by way of example, and that numerous changes in the details of construction and the combination and arrangement of parts may be resorted to without departing from the spirit and scope of the invention.

What is claimed is:

1. A safety module for incorporation into an inset provided midway along the length of one side of a flatbed of a flatbed truck, with the module providing both:
   a) a relatively lower level platform relative to the height of the flatbed of the truck, on which lower level platform a workperson can stand 1) while placing traffic delineators at spaced locations alongside a roadway work zone, and 2) while retrieving traffic delineators from spaced locations alongside the roadway work zone as the truck is driven alongside the roadway work zone; and
   b) a relatively upper level platform onto which traffic delineators can be placed one at a time when the delineators are either are ready to be placed alongside the roadway work zone, or that have just been retrieved from alongside the roadway work zone, wherein:
      the lower level platform and the upper level platform are each located below the height of the flatbed of the truck; and
      the upper level platform is located beside the lower level platform to enable the workperson to use the upper level platform as a step to transition between standing on the lower level platform and standing on the flatbed.

2. The safety module of claim 1 including a housing mountable in the inset, which housing supports both the lower level platform and the upper level platform, with the upper level platform being located at a height midway between the height of the lower level platform, and the height of the flatbed of the truck.

3. The safety module of claim 1 wherein the lower level platform is located relatively near to the height of a road surface onto which traffic delineators are to be placed, and from which traffic delineators are to be retrieved as the truck is driven alongside the roadway work zone.

4. The safety module of claim 3 wherein the upper level platform is located at a height substantially midway between the height of the flatbed of the truck, and the height of the lower level platform.

5. A safety module for incorporation into a left or right side inset of the flatbed of a truck for assisting workpersons to safely place traffic delineators at spaced locations alongside a roadway work zone, and to assist workpersons to safely retrieve traffic delineators from spaced locations alongside the roadway work zone, with the module comprising:
  a) a housing mountable in one of the left or right side insets to depend below the height of the flatbed of the truck to define a safety compartment;
  b) a lower level platform fastened to the housing at a height near a bottom of the safety compartment to provide a surface on which a workperson can stand; and
  c) an upper level platform fastened to the housing at a height midway between the height of the lower level platform and the height of the flatbed of the truck;
  d) with the upper level platform defining a surface on which traffic delineators can be temporarily positioned, one at a time, that are delivered from the flatbed of the truck for being placed at spaced locations alongside the roadway work zone by a workperson who is standing on the lower level platform, and on which traffic delineators can be placed, one at a time, after being retrieved from alongside the roadway work zone by a workperson standing on the lower level platform.

6. The safety module of claim 5 that has left-side and right-side embodiments for installation in a left-side inset of the flatbed, and in a right-side inset of the flatbed, respectively, with the left-side and the right-side embodiments being mirror-image reversals of each other.

7. The safety module of claim 6 wherein each of the left-side and right-side embodiments have separate fence-like gates that are pivotally connected to the housing for extending reaching across and extending above a region in front of at least the lower level platform to enable entry into and exit from within the safety module by the workperson in which the workperson is able to transition between standing on the lower level platform and standing on a roadway surface of the roadway work zone.

8. The safety module of claim 5 wherein:
  each of the left-side and right-side embodiments has a platform-like door that overlies associated ones of the lower level and upper level platforms when pivoted down to a horizontal closed position extending alongside the flat bed; and
  each platform-like door that overlies an associated upper level platform carries a depending support that rests atop the associated upper level platform to support the platform-like door when the platform-like door is pivoted down to its horizontal closed position.

9. The safety module of claim 5 additionally including a structurally strong safety rail guard assembly with an upwardly movable tubular component that can be latched at a variety of releasably latchable heights at locations in front of a workperson standing in the compartment on the lower level platform of the safety module.

10. The safety module of claim 5 wherein the lower level platform is generally rectangular in shape, and measures at least 24 inches by 24 inches.

11. The safety module of claim 5 wherein the upper level platform is generally rectangular in shape, and measures at least 24 inches by 24 inches.

12. The safety module of claim 5 wherein the housing, when mounted in the inset of a flatbed of a truck and when measured forwardly to rearwardly relative to a truck on which the housing will be installed, measures between about 48 and 60 inches from front to rear along an associated side of the flatbed of the truck.

13. A truck that has
  a) a flatbed atop which workpersons can stand to manage traffic delineators that are positioned atop the flatbed, and
  b) a man basket safety module mounted in an inset formed in the flatbed along one side of the flatbed of the truck, with the man basket safety module including both;
    i) a lower level platform on which a workperson can stand while both placing traffic delineators at spaced locations alongside a roadway work zone as the truck moves alongside the work zone, and while retrieving traffic delineators from alongside the roadway work zone as the truck moves alongside the work zone; and
    ii) an upper level platform located beside the workperson who is standing on the lower level platform to enable the workperson to use the upper level platform as a step to transition between standing on the lower level platform and standing on the flatbed, and located at a height substantially midway between a height of the lower level platform and a height of the flatbed of the truck, wherein the upper level platform is sized to permit barrel-like traffic delineators to be positioned thereatop, one at a time, that are to be placed alongside the roadway work zone, and to permit barrel-like traffic delineators to be positioned thereatop, one at a time, just after the delineators have been retrieved from alongside the roadway work zone.

14. The truck of claim 13 wherein the upper level platform is generally rectangular and is sized to measure no less than about 24 by 24 inches.

15. The truck of claim 13 wherein the lower level platform is generally rectangular and is sized to measure no less than about 24 inches by 24 inches.

16. The truck of claim 13 wherein the man basket module measures between about 48 and 60 inches forwardly to rearwardly along a side of the flatbed of the truck on which the module is installed.

17. The truck of claim 13 comprising a pair of left-side and right-side mirror-image embodiments of the man basket safety module that provide appearances which are mirror-image reversals of each other.

18. The truck of claim 17 wherein each of the left-side and right-side module embodiments have fence-like gates that are pivotally connected to the housing, and that extend along and above at least the lower level of each of the left-side and the right-side module embodiments to enable entry into and exit from within each of the left-side and right-side module embodiments by the workperson in which the workperson is able to transition between standing on the lower level platform and standing on a roadway surface of the roadway work zone.

19. The site truck of claim 17 wherein:
each of the left-side and right-side module embodiments has a platform-like door that can overlie the lower level and upper level platforms of the left-side and right-side module embodiments when pivoted down to a horizontal closed position extending alongside the flat bed; and
each platform-like door carries a depending support that rests atop the upper level platform to support the platform-like door when the platform-like door is pivoted down to its horizontal closed position.

20. The truck of claim 17 wherein each of the left-side and right-side safety module embodiments has a structurally strong safety rail guard assembly with an upwardly movable tubular safety rail component that can be latchingly retained at a variety of releasably latchable heights at locations in front of where a workperson who is standing in the compartment of the associated safety module to retaining a workperson in the associated compartment.

21. A truck having:
a flatbed; and
an inset formed in the flatbed at a location midway along the length of one of the sides of the flatbed into which a man basket safety module is installed, wherein the man basket safety module includes a housing that depends below a height of the flatbed to support:
  1) a lower level platform fastened to the housing that defines a substantially horizontally extending first surface of at least 24 inches by 24 inches in size on which a workperson can stand located below the height of the flatbed of the truck; and
  2) an upper level platform fastened to the housing, that defines a substantially horizontally extending second surface located midway between the height of the flatbed and the height of first surface, and being situated to one side of where a workperson can stand on the first surface, with the second surface being of at least 24 inches by 24 inches in size for supporting barrel-like traffic delineators that are placed one at a time on the second surface.

22. The truck of claim 21 including a tool box located beneath the second upper level platform, wherein the tool box having a downwardly pivotal door for closing at least the majority of a front opening of the tool box.

23. The truck of claim 21 wherein the lower level platform is located relatively near to the height of a road surface onto which traffic delineators are to be placed, and from which traffic delineators are to be retrieved as the truck is driven alongside the roadway work zone.

24. The truck of claim 21 wherein the man basket safety module has left-side and right-side embodiments that can be installed in insets located along left and rights sides, respectively, of the flatbed, with the left-side and right-side module embodiments being mirror-image reversals of each other.

25. The truck of claim 24 wherein each of the left-side and right-side module embodiments has a fence-like safety gate that is pivotally connected to the housing, and extends along and above a at least the lower level platform of the associated left-side and right-side module to enable entry into and exit from within the associated left-side and right-side module by the workperson in which the workperson is able to transition between standing on the lower level platform and standing on a roadway surface of a roadway work zone.

26. The truck of claim 24 wherein:
each of the left-side and right-side module embodiments has a platform-like door that overlies one of the lower level platform and the upper level platform of the associated left-side and right-side module when pivoted down to a horizontal closed position extending alongside the flat bed; and
each platform-like door that overlies an upper level platform carries a depending support that rests atop the upper level platform to support the platform-like door when the platform-like door is pivoted down to its horizontal closed position.

27. The truck of claim 24 additionally including a structurally strong guard assembly with an upwardly movable tubular safety rail component that can be releasably latchingly retained at a variety of heights at locations in front of a workperson standing on the lower level platform.

28. The safety module of claim 1 further comprising a tool box located beneath the upper level platform, wherein the tool box has a downwardly pivotal door for closing at least the majority of a front opening of the tool box.

29. The safety module of claim 5 further comprising a tool box located beneath the upper level platform, wherein the tool box has a downwardly pivotal door for closing at least the majority of a front opening of the tool box.

30. The truck of claim 13, wherein the man basket safety module further comprises a tool box located beneath the upper level platform, wherein the tool box has a downwardly pivotal door for closing at least the majority of a front opening of the tool box.

* * * * *